US009144114B2

(12) United States Patent
Lewin

(10) Patent No.: US 9,144,114 B2
(45) Date of Patent: Sep. 22, 2015

(54) HEATER ELEMENT AS WELL AS AN INSERT FOR ELECTRICAL FURNACES

(75) Inventor: Thomas Lewin, Hallstahammar (SE)

(73) Assignee: Sandvik Intellectual Property AB, Sandviken (SE)

( * ) Notice: Subject to any disclaimer, the term of this patent is extended or adjusted under 35 U.S.C. 154(b) by 520 days.

(21) Appl. No.: 12/449,991

(22) PCT Filed: Jan. 2, 2008

(86) PCT No.: PCT/SE2008/050003
§ 371 (c)(1),
(2), (4) Date: Sep. 4, 2009

(87) PCT Pub. No.: WO2008/108712
PCT Pub. Date: Sep. 12, 2008

(65) Prior Publication Data

US 2010/0059499 A1 Mar. 11, 2010

(30) Foreign Application Priority Data

Mar. 5, 2007 (SE) ...................................... 0700558
Mar. 5, 2007 (SE) ...................................... 0700559

(51) Int. Cl.
*F24C 7/06* (2006.01)
*B01J 3/06* (2006.01)
(Continued)

(52) U.S. Cl.
CPC .............. *H05B 3/66* (2013.01); *F27D 99/0006* (2013.01); *F27D 2099/0008* (2013.01); *H05B 2203/018* (2013.01)

(58) Field of Classification Search
CPC .............. F24C 7/06; F24C 7/08; F24C 7/087; B01J 3/06; C30B 33/00
USPC ......... 219/407, 409–411, 542, 553, 532, 536, 219/537, 546; 373/27, 57, 109, 140, 148, 373/154, 152, 151, 160
See application file for complete search history.

(56) References Cited

U.S. PATENT DOCUMENTS 1,695,882 A 12/1928 Colby
1,921,543 A 8/1933 Schonfeld
(Continued)

FOREIGN PATENT DOCUMENTS

| | | |
|---|---|---|
| EP | 1 010 355 | 6/2000 |
| JP | 63-10487 A | 1/1988 |
| JP | 2001-513871 | 9/2001 |
| KR | 10-2006-0070482 | 6/2006 |

OTHER PUBLICATIONS

WO 199819500, Jan. 2011.*
(Continued)

*Primary Examiner* — Tu B Hoang
*Assistant Examiner* — Thomas Ward
(74) *Attorney, Agent, or Firm* — Morgan, Lewis & Bockius LLP

(57) ABSTRACT

Insert for electrical furnaces comprising an insulating shell and a coiled heater element, the heater element comprising element wire that consists of at least two sections that are interconnected via a bend of element wire in such a way that the bend and the sections mutually form a loop of element wire. A fastening member is fixedly anchored in the insulating shell and arranged in the area of the bend in such a way that the element wire in a section directly connected to the bend is prevented from expanding past the fastening member.

12 Claims, 4 Drawing Sheets

(51) Int. Cl.
*H05B 3/66* (2006.01)
*F27D 99/00* (2010.01)

(56) References Cited

U.S. PATENT DOCUMENTS

| | | | | |
|---|---|---|---|---|
| 2,035,306 | A * | 3/1936 | Fannin | 373/130 |
| 4,553,246 | A * | 11/1985 | Christie | 373/130 |
| 5,122,640 | A * | 6/1992 | Holmes | 219/532 |
| 5,324,920 | A * | 6/1994 | Nakao | 219/542 |
| 6,008,477 | A | 12/1999 | Nakao et al. | |
| 6,125,134 | A | 9/2000 | Jönsson et al. | |
| 6,807,220 | B1 * | 10/2004 | Peck | 373/128 |
| 7,027,722 | B2 * | 4/2006 | Uemori et al. | 392/416 |
| 2005/0069014 | A1 * | 3/2005 | Uemori et al. | 373/109 |
| 2005/0224182 | A1 * | 10/2005 | Edamura et al. | 156/345.48 |

OTHER PUBLICATIONS

European Search Report for 08705276.7, dated Dec. 16, 2011.

English Translation of Notice of Reasons for Rejection dated Dec. 20, 2011, issued in a corresponding Japanese patent application.

Communication from the European Patent Office dated Jan. 12, 2012, issued in a corresponding European patent application.

Japanese Office Action reporting Decision for Grant, dated Jul. 30, 2013, for counterpart JP Application No. 2012-127071.

Certificate of Patent registered on Sep. 6, 2013, as Japanese Patent Registration No. 5357305, with English translation of claims, for counterpart JP Application No. 2012-127071.

KIPO: Office Action (Notice of Grounds for Rejection) for Korean Patent Application No. KR 10-2009-7020650— Issued on Jan. 27, 2014—Including English Translation.

* cited by examiner

*Fig. 4*
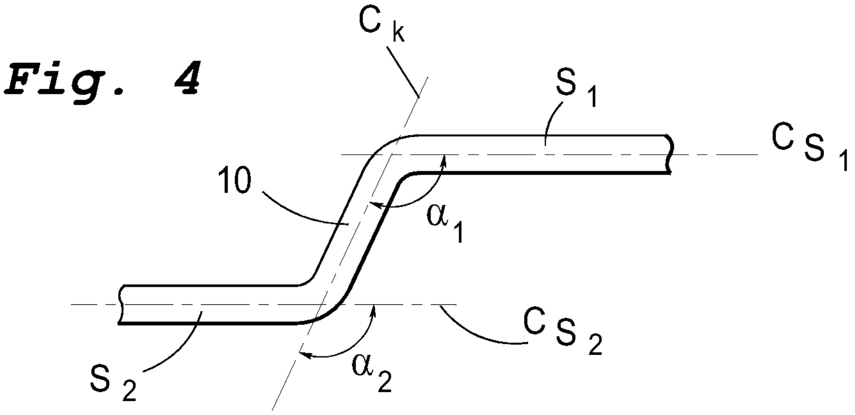
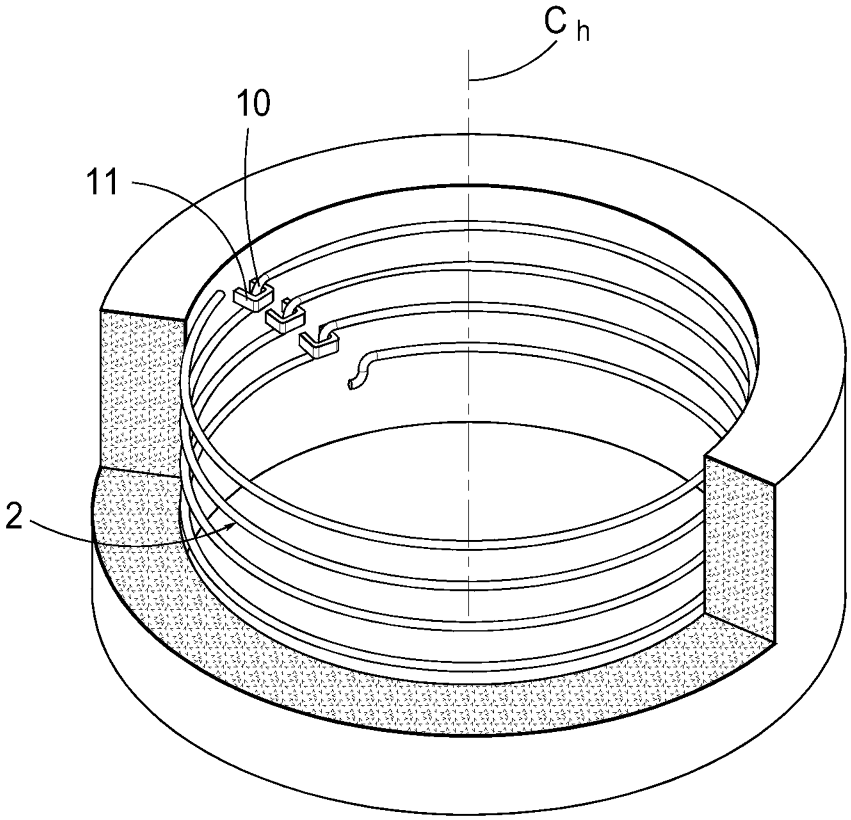
*Fig. 5*

HEATER ELEMENT AS WELL AS AN INSERT FOR ELECTRICAL FURNACES

RELATED APPLICATION DATA

This application is a §371 National Stage Application of PCT International Application No. PCT/SE2008/050003 filed Jan. 2, 2008, and claims priority under 35 U.S.C. §119 and/or §365 to Swedish Application No. 0700558-0, filed Mar. 5, 2007, and to Swedish Application No. 0700559-8, filed Mar. 5, 2007.

The present invention generally relates to a coiled heater element of element wire as well as an insert for electrical furnaces comprising such a coiled heater element.

Furnaces heated in electrical way are often constructed of inserts in the form of a refractory and heat-insulating shell as well as one or more heater elements that are mounted inside said shell and consist of an electrically conducting material, which is suitable to form a resistance element having the ability to emit heat energy when electric current is supplied. In practice, the shell consists most often of an insulating ceramic material, while the heater elements may consist of wires manufactured from special alloys, such as Fe—Cr—Al alloys and Ni—Cr alloys, or from intermetallic materials, such as $MoSi_2$. In many types of furnaces, it is of vital importance that the temperature distribution is kept uniform in the furnace space that is charged with materials for treatment. For certain applications, in which, for instance, diffusion furnaces are used, requirements are accordingly made that the temperature difference in different points in the furnace space must not exceed 0.1° C. To provide for these requirements, coiled elements, also called helices, are particularly well suitable since the same can be given a uniform pitch without considerable irregularities. A peculiarity of the element wires of the heater element, which may have a considerable total length depending on the number of turns therein, is that the wire is alternatingly expanding and shrinking depending on occurring temperature variations. As a rule of thumb, the wire expands at least 1% when the temperature is raised from room temperature to operating temperature, which usually is above 1000° C. In other words, the wire is extended at least 10 mm per running meter, which means that a wire having, for instance, a length of 50 m is expanded (and contracted) as much as 500 mm. If the wire would be freely movable, such length variations could be accommodated by axial as well as radial expansion of the coiled heater element. However, in order to prevent this, the mobility of the wire mounted inside the insulation shell is often limited in various ways. If the same is prevented from increasing the diameter thereof along a part of the axial extension thereof, the expansion, which normally is uniformly distributed, has to be accommodated as a locally greater deformation. This may lead to the wire either being plastically deformed or pressed out in the insulation material. In certain constructions, such as diffusion furnaces, the element wire is mounted at a certain radial distance inside a cylindrical inside of the shell. The element wire is provided with current outlets usually arranged at the axially opposite ends of the wire. It is also possible to divide the heater element into heat zones by the fact that the element wire also has additional welded-on outlets, for example flat irons, which project radially from the element wire and extend radially out through the insulation. In this case, the aim of the element wire to expand radially requires that the expansion space toward the inside of the shell is sufficiently great, while an aim to expand axially results in stresses adjacent to the outlets.

In certain constructions, the coiled element wire is placed in a groove formed in the inside of the insulation shell and having the same coiled shape as the element wire. In this connection, the outlets are usually arranged at the axially opposite ends of the wire. In this case, there is a risk that the element wire partly creeps out of the groove, for instance as a consequence of the wire getting caught in some spot (by adhering in the groove), which brings about that accumulation of the expansion applies forces to the element wire that partially presses the same out of the groove.

Examples of inserts for electrical furnaces comprising an insulating shell and a coiled heater element of element wire are disclosed in U.S. Pat. No. 6,008,477 A. The element wire is provided with a plurality of fixing members, which protrude from the element wire and are either directly anchored in the insulation or in contact with support members, which in turn are anchored in the insulation in such a way that the element wire still can move in relation to the support members. In both cases, the element wire is, by means of the fixation members, prevented from moving freely as a consequence of thermal expansion or contraction. However, this solution is relatively complicated since it requires to the element wire is provided with separate fixing members.

Thus, the object of the present invention is to prevent accumulation of the expansion of the element wire.

SUMMARY

The object is provided by a coiled heater element in accordance with the independent claim 1 as well as an insert for electrical furnaces in accordance with the independent claim 7. Preferred embodiments are defined in the dependent claims.

The electrical heater element comprises element wire that is divided into at least two sections. The sections are interconnected by means of a bend of element wire in such a way that the sections and the bend mutually form an integrated loop of element wire, i.e., the bend is a functional part of the heater element in such a way that it constitutes resistance to current conducted between the different adjacent sections and, in such a way, generates heat in the same way as the sections. The bend is foremost intended to prevent accumulation of expansion of the element wire in a first section into a second section connected thereto via the bend by means of a fastening member arranged in the area of the bend. The bend is formed in such a way that a center axis of the element wire in at least a part of the bend forms an angle with a center axis of the element wire in a section directly connected to the bend.

BRIEF DESCRIPTION OF THE FIGURES

FIG. 4 shows a cross-section of a bend and two adjacent sections of element wire.

FIG. 5 shows a partly sectioned perspective view of a furnace insert according to one embodiment of the invention.

DETAILED DESCRIPTION

Figure 1:
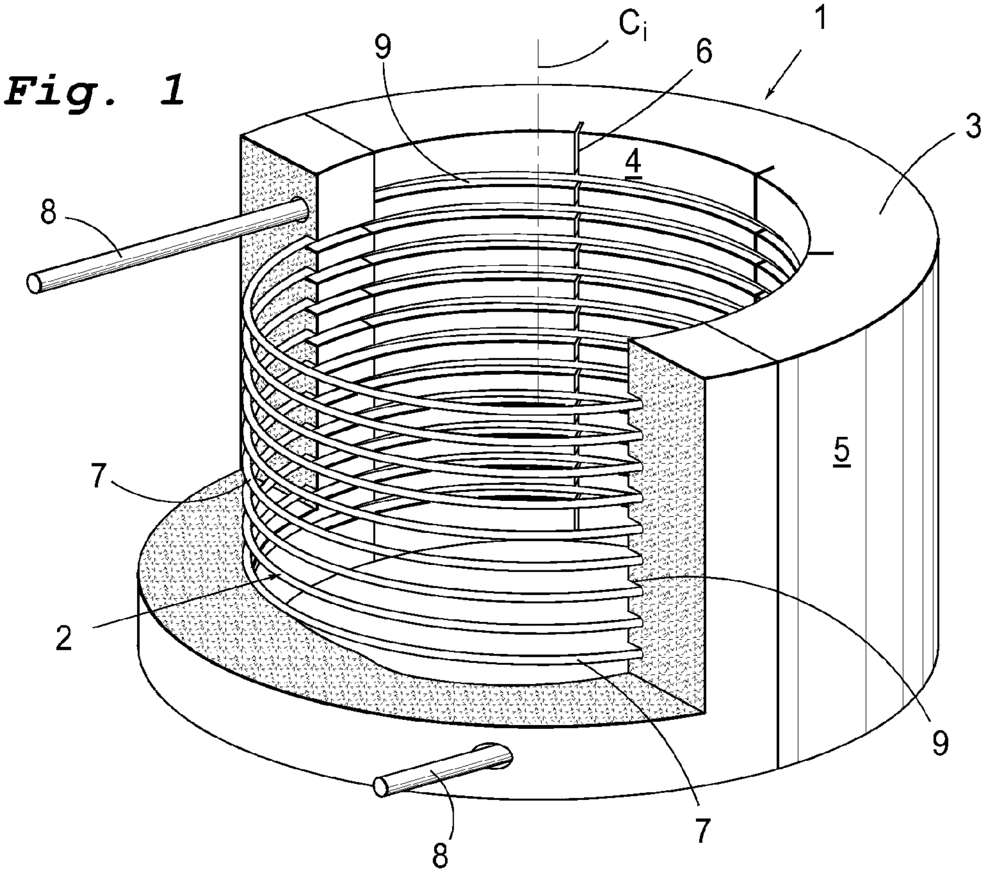
FIG. 1 shows a partly sectioned perspective view of a furnace insert according to prior art.

An insert 1 comprising an insulating shell 3 as well as a heater element 2 of element wire 7 is shown in FIG. 1. The insulating shell 3 consists of a cylinder of ceramic material, for instance ceramic fibers, in accordance with prior art, and has an inner surface 4 and an outer surface 5 as well as has a rotationally symmetrical shape, alternatively a substantially rotationally symmetrical shape, around a center axis $C_i$. The insulating shell may, in accordance with prior art, be constructed of a plurality of modules that together form the cylinder. The diameter of the cylinder may vary, for instance, within the range of 100-400 mm while the length may be, for instance, within the range of 100-1200 mm. It should also be mentioned that the insulating shell may be provided with slots 6 in the inside of the insulation shell to counteract stresses in the shell as a consequence of the temperature variations.

The element wire may consist of any material that is suitable to form an electrical resistance element, usually in the form of some special alloy, such as Fe—Cr—Al, or intermetallic material, such as $MoSi_2$. The element wire may, but does not have to, have a cross-section shape having a diameter that for many wires varies within the range of 3-10 mm. The element wire 7 is wound in a coiled shape of a uniform pitch, the outer diameter of the coil being smaller than the inner diameter of the insulating shell. At the axially opposite ends thereof, the element wire is connected to outlets 8, which extend out through the insulation to be electrically connected on the outside. The coiled heater element has a center axis that generally coincides with the center axis $C_i$ of the insulating shell. The length of the element wire may vary according to different types of applications, it also depends on the pitch of the coiled shape as well as the insert in which the heater element is intended to be placed. However, in many cases, the element wire has a length of between 10 m and 100 m or even longer. The heater element may be supported in the insert by means of support members (not shown), for instance staples, or such a support member that is illustrated by reference designation 11 in U.S. Pat. No. 6,008,477. Most often, the support members allow the element wire to expand and contract freely. The support members have also the function of separating the different turns of element wire from each other. It is also possible to attain the same function as the support members have by providing the insulating shell with internal grooves 9 having substantially the same coiled shape as the element wire and let the element wire run in these grooves. However, in this case, the coil of the element wire has an outer diameter that is somewhat greater than the inner diameter of the insulating shell.

As far as the disclosed insert hitherto has been described, the same is in all essentials known.

According to the invention, the element wire is divided into sections that are interconnected via a bend of element wire in such a way that the sections and the bend mutually form a closed loop of element wire. The bend is, in the same way as other parts of the element wire, arranged in such a way that there is a space between it and the insulating shell, i.e., it is not directly connected with the insulating shell. Furthermore, the bend is formed in such a way that a center axis of the element wire in at least a part of the bend forms an angle with a center axis of the element wire in the adjacent sections. The angle is preferably arranged in a plane parallel to the center axis of the coil. The bend may suitably be a Z- or S-shaped bend. The bend may either be welded onto the element wire of the sections or be a bending of the element wire.

In the area of the bend, the element wire is fixed against displacement of the element wire of the sections past said bend by means of a fastening member that is fixedly anchored in the insulating shell. The aim of the element wire to get displaced depends most often on expansion or contraction of the material of the element wire. As a consequence of the bend as well as the fastening member, the aim of expansion of the element wire in the individual section cannot propagate into an adjacent section, i.e., the expansion of the element wire is not accumulated but is distributed uniformly over the heater element. The expansion of the individual section becomes in turn very limited (typically less than 10 mm depending on the length of the sections) and there is room, for instance in the support members or the grooves, in the case the insert comprises such, for such a marginal expansion, because it is takes place radially. Accordingly, the possibility of expansion that has to be taken into consideration in the design of the insert is considerably decreased.

According to a preferred embodiment, the fastening member is arranged in such a way that it is traversed by the element wire of the bend. In the simplest design thereof, the fastening member may, for instance, be a U-shaped staple having two free ends that are embedded in the insulating shell and, in such a way, fixedly anchored. The fastening member may be welded to the element wire but is preferably loosely arranged against the element wire.

According to an alternative embodiment, the fastening member is arranged in such a way that the element wire of the bend run around the same. In this case, the fastening member is a plate having a first and a second face that are parallel to (or substantially parallel to) each other and that have an extension in the axial direction of the insulating shell as well as a face that is perpendicular (or substantially perpendicular) to the parallel faces and fixedly anchored in the insulating shell. Furthermore, the bend according to this embodiment has two parallel, or substantially parallel legs, which have an extension radially inward toward the center axis ($C_h$) of the coiled heater element and which are located on each side of the fastening member in such a way that, upon displacement of the element wire in a section, for example as a consequence of expansion, one of the parallel legs of the bend will abut against one of the parallel faces of the fastening member.

Figure 2:
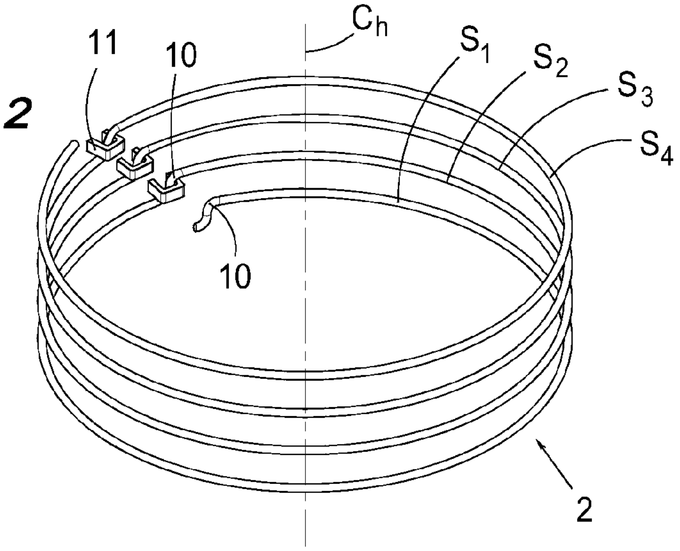
FIG. 2 shows a perspective view of an embodiment of a heater element according to the invention.
Figure 3:
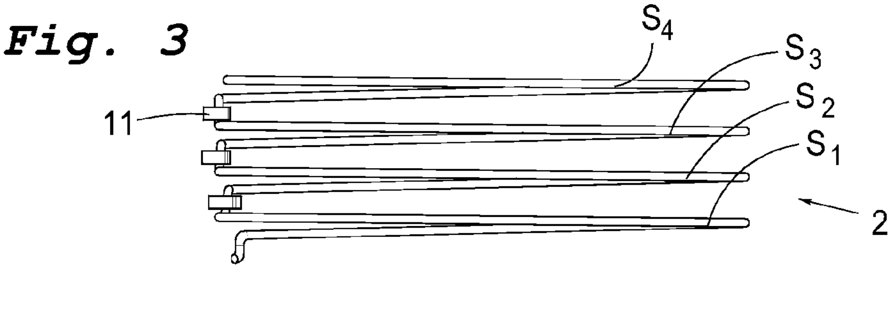
FIG. 3 shows a side view of the heater element according to FIG. 2.

FIGS. 2 and 3 show a heater element according to a preferred embodiment. The element wire extends a plurality of turns in a coiled loop having a uniform pitch around a center axis $C_h$. At the axially opposite ends thereof, the element wire is connected to outlets (not shown), which are intended to extend through an insulation in which the heater element is arranged. In accordance with the invention, the element wire is formed with at least one bend 10, which divides the element wire into sections $s_1$, $s_2$. Preferably, the coiled heater element comprises a plurality of bends 10 that divide the element into a plurality of sections $s_1$, $s_2$, $s_3$, $s_4$. The element wire is fixed to the insulation by means of a fastening member 11 placed in the area of the bend 10. In such a way, the fastening member 11 will prevent the thermal expansion of one section ($s_1$, $s_2$, $s_3$, $s_4$) of the element wire from accumulating into the next section of the element wire.

FIG. 4 shows how the bend is arranged according to one embodiment by the fact that a center axis $C_k$ of the element wire in at least a part of the bend 10 forms an angle $\alpha_1$ with a center axis $C_{s1}$ of the element wire in a first adjacent section $s_1$. In the figure, it is also shown that the center axis $C_k$ of the element wire in at least a part of the bend 10 forms an angle $\alpha_2$ with a center axis $C_{s2}$ of the element wire in the second adjacent section $s_2$. In FIG. 4, the angles $\alpha_1$ and $\alpha_2$ are arranged in a plane parallel to the center axis of the coiled heater element (see $C_h$ in FIG. 2).

In practice, the sections ($s_1$, $s_2$, $s_3$, $s_4$) of element wire between each bend 10 should amount to at most 1.5 turn, preferably one turn or less.

In FIG. 5, an insert 1 for electrical furnaces in accordance with the invention is shown comprising an insulating shell 3 and a heater element 2 (such as has been shown in FIG. 2). In the figure, the insulating shell has a smooth inner surface. The heater element consists of element wire that extends a plurality of turns in a coiled loop having a uniform pitch around a center axis $C_h$. At the axially opposite ends thereof, the element wire is connected to outlets (not shown), which extend through the insulating shell. In accordance with the invention, the element wire is formed with a plurality of bends 10, which divide the element wire into sections. Fastening member 11 is arranged in the area of each bend 10, wherein accumulation of the expansion of the element wire from one section into another adjacent section is prevented. The fastening member 11 may, for instance, be a U-shaped staple.

Figure 6:
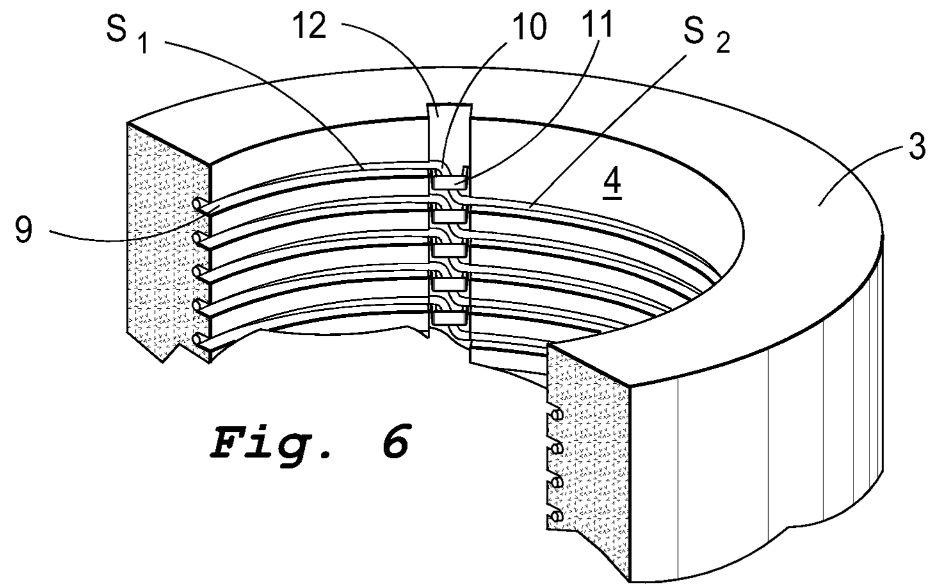
FIG. 6 shows a partly sectioned perspective view of a furnace insert according to one embodiment of the invention.

FIG. 6 shows an alternative embodiment of the invention. In this case, the insulating shell 3 is provided with grooves 9 that run in a coiled shape in the inner surface 4 thereof. The element wire is arranged to run in the grooves 9. The insulating shell is also provided with an axial groove 12 in the inner surface 4 of the shell. The bend 10 as well as the fastening member 11 are arranged in the axial groove 12.

Figure 7:
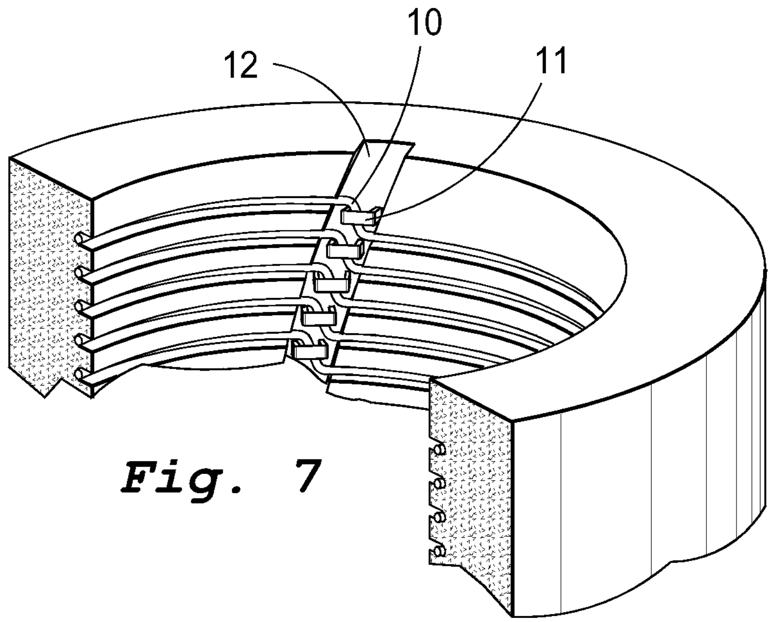
FIG. 7 shows a partly sectioned perspective view of a furnace insert according to one embodiment of the invention.

According to an alternative embodiment, the bends and the fastening members are peripherally arranged in a diagonal configuration. In such a way, it is prevented that different parts of the element wire run the risk of coming in contact with each other, for instance contact between a bend with a part of an adjacent turn of element wire that the connection wire is not directly connected to. In FIG. 7, an example is shown of such a configuration for the case that the insulating shell has coiled grooves on the inside thereof as well as an axial groove 12. In this case, also the axial groove 12 has a diagonal configuration in the same way as the bends 10 and the fastening members 11.

Figure 8:
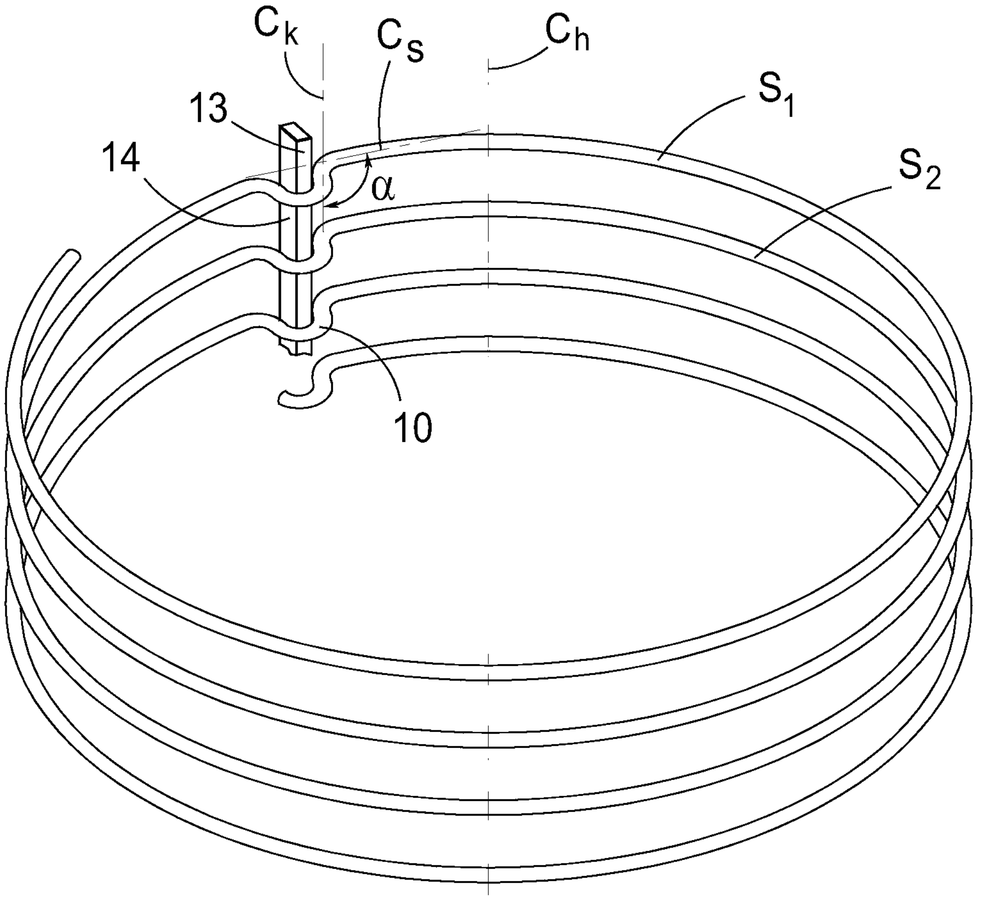
FIG. 8 shows a perspective view of an alternative embodiment of a heater element according to the invention.

An alternative embodiment of the insert and the heater element thereof is illustrated in FIG. 8. In this case, the bend is formed in such a way that a center axis $C_k$ in at least a part of the element wire of the bend forms an angle α with a center axis $C_s$ of the element wire of an adjacent section, the angle a being in a plane perpendicular to the center axis of the coil. According to this embodiment, the bend 10 is a U-shaped bend having an extension in the radial direction of the coil inward toward the center axis thereof. It is also feasible that the bend comprises two parallel legs as well as a perpendicular leg connected to said parallel legs in such a way that they form a Π-shape. A fastening member 13 is arranged in the area of the bend 10 and is fixedly anchored in the insulating shell (not shown in the figure). According to this embodiment, the fastening member 13 is formed in such a way that at least one of the legs of the bend, upon a thermal expansion, prevents accumulation of the expansion by abutting one side 14 of the fastening member. The fastening member may, according to this embodiment, be a plate having an extension in the axial direction of the insulating shell, wherein it is arranged in a plurality of the bends of the coiled heater element, in the way shown in FIG. 8. It is also conceivable with a plurality of smaller fastening members, which only are arranged in a bend each.

The invention is not limited to the embodiments described above and shown in the drawings but is varied within the scope of the independent claims. Thus, instead of U-shaped staples, it is feasible to use other types of fastening members and to anchor these in another way than as has been described above. For instance, the different fastening members may be included in a common holder, which in turn is fixed in the insulation. Furthermore, it is feasible that the insulation has another rotationally symmetrical shape than cylindrical, in particular conical. In this case, also the heater element will be conically coiled. It is also feasible that the heater element is divided into heat zones by it being provided with a plurality of outlets, for instance flat irons, which extend through the insulating shell in the same way as has been described in accordance with prior art. Furthermore, it is also possible that the insert comprises a plurality of heater elements where at least one is formed in accordance with the description of the invention above. The insert may also contain additional supports or fastening devices for the heater element.

The invention claimed is:

1. An insert for electrical furnaces comprising:

an insulating shell having an inside as well as an outside, the inside having a rotationally symmetrical shape around a center axis of the insulating shell, as well as a coiled heater element arranged at the inside of the insulating shell and comprising an element wire of resistance material, wherein the coiled heater element has a center axis that generally coincides with the center axis of the insulating shell, and wherein the element wire includes at least two sections, which are helical turns of the element wire interconnected via a bend of element wire in such a way that the bend and the sections mutually form a coiled loop of element wire about the center axis of the coiled heater element, the at least two sections being axially pitched apart from each other, a center axis of the element wire in at least a part of the bend forming an angle with a center axis of the element wire in a section connected to the bend, a fastening member placed in the area of the bend to prevent thermal expansion of one of the sections of the element wire from accumulating into a next one of the sections of the element wire, the fastening member being fixedly anchored in the insulating shell and arranged in the area of the bend in such a way that the element wire in a section directly connected to the bend is prevented from being displaced past the fastening member into the other section directly connected to the bend, wherein the fastening member is traversed by the element wire of the bend in an axial direction relative to the center axis of the coiled heater element; and wherein the element wire comprises a plurality of bends that divide the element into a plurality of sections, the element wire in each section being prevented from being displaced past a fastening member arranged in the area of a bend connected to the respective section.

2. Insert according to claim 1, wherein each section amounts to at most 1.5 turns of the coil.

3. Insert according to claim 1, wherein the bends as well as fastening members are arranged in a diagonal configuration in relation to the center axis of the coiled heater element.

4. Insert according to claim 1, wherein the insulating shell has a coiled groove in the inner surface thereof in which the element wire of the coiled heater element runs, as well as that the insulating shell has an axial groove in the inner surface thereof in which the bend of the element wire as well as the fastening member are arranged.

5. Insert according to claim 4, wherein the axial groove has a diagonal extension.

6. Insert according to claim 1, wherein the angle is in a plane parallel to the center axis of the coiled heater element.

7. Insert according to claim 1, wherein the angle is in a plane perpendicular to the center axis of the coiled element, that the bend comprises two parallel, or substantially parallel, legs that are interconnected and that have an extension radially inward toward the center axis of the coiled heater element, as well as that the fastening member is arranged between the legs of the bend in such a way that the element wire in a first section is prevented from being displaced past the fastening member toward a second section adjacent to the first section by one of the legs of the bend abutting the fastening member.

8. The insert according to claim 1, wherein the axial pitch between the at least two helical sections is uniform, a first of the at least two helical sections being entirely further in the axial direction than a second of the at least two helical sections, and the at least two helical sections having the same radius of curvature.

9. The insert according to claim 1, wherein each section amounts to one turn or a partial turn of the coil.

10. The insert according to claim 1, wherein the element wire is arranged such that there is a space between the element wire and the insulating shell of the furnace.

11. The insert according to claim 1, wherein each of the helical sections extends axially along the center axis of the coiled heater element.

12. The insert according to claim 1, wherein the bend is arranged in a diagonal configuration relative to the center axis of the coiled heater element.

* * * * *